United States Patent
Machida et al.

(10) Patent No.: US 8,711,497 B2
(45) Date of Patent: Apr. 29, 2014

(54) LENS DRIVING DEVICE

(71) Applicant: Nidec Copal Corporation, Tokyo (JP)

(72) Inventors: Takuya Machida, Koga (JP); Kazuo Shikama, Tsuchiura (JP); Haruhiko Mandai, Tokyo (JP); Yusuke Ehara, Toda (JP); Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/753,846

(22) Filed: Jan. 30, 2013

(65) Prior Publication Data

US 2013/0194683 A1  Aug. 1, 2013

(30) Foreign Application Priority Data

Jan. 30, 2012  (JP) ................. 2012-016827

(51) Int. Cl.
*G02B 7/02* (2006.01)
*G03B 17/00* (2006.01)
*H04N 5/228* (2006.01)

(52) U.S. Cl.
USPC ........... 359/824; 359/814; 359/813; 359/823; 359/557; 396/55; 348/208.11

(58) Field of Classification Search
USPC ................. 359/811, 813, 814, 823, 824, 819, 359/694–697, 554–557; 348/E5.028, 348/E5.046, 208.11, 333.01; 396/55, 87, 396/120
See application file for complete search history.

(56) References Cited

U.S. PATENT DOCUMENTS

| | | | | |
|---|---|---|---|---|
| 5,974,269 | A * | 10/1999 | Sato et al. | 396/55 |
| 7,375,908 | B2 * | 5/2008 | Takahashi | 359/819 |
| 8,320,753 | B2 * | 11/2012 | Lee et al. | 396/55 |
| 8,351,771 | B2 * | 1/2013 | Ito | 396/55 |
| 8,558,898 | B2 * | 10/2013 | Kanda | 348/208.11 |
| 8,582,205 | B2 * | 11/2013 | Hasegawa | 359/557 |

FOREIGN PATENT DOCUMENTS

JP  2007-041419  2/2007

* cited by examiner

*Primary Examiner* — Loha Ben
(74) *Attorney, Agent, or Firm* — Troutman Sanders LLP

(57) ABSTRACT

A lens driving device includes a base member, a movable member that is disposed at the base member and moves in a plane that is orthogonal to an optical axis, a first driving portion that moves the movable member in a direction that is orthogonal to the optical axis in accordance with image shake, a lens frame that is mounted to the movable member and moves in a direction of the optical axis, a second driving portion that moves the lens frame in the direction of the optical axis and includes a first magnet that is secured to the movable member and a first coil that is secured to the lens frame, and a Hall element that is disposed so as to oppose the first magnet in the direction of the optical axis and detects a change in a magnetic field of the first magnet.

3 Claims, 5 Drawing Sheets

LENS DRIVING DEVICE

CROSS REFERENCE TO RELATED APPLICATION

The present application claims priority to Japanese Patent Application No. 2012-016827 filed in the Japan Patent Office on Jan. 30, 2012, the entire contents of which are incorporated herein by reference.

FIELD OF THE INVENTION

The present invention relates to a lens driving device that corrects image shake as a result of moving an image pickup optical system in a direction that is orthogonal to an optical axis.

BACKGROUND OF THE INVENTION

Hitherto, a hand movement correcting mechanism that is described in Japanese Unexamined Patent Application Publication No. 2007-41419 (Patent Document 1) has been available as a technology in such a field. The hand movement correcting mechanism includes a fixing member that is fixed to a body of an image pickup apparatus, a movable member for holding a lens barrel, an actuator for applying rotational force to the movable member, and position detecting means for detecting the position of the movable member. For indicating the position of the movable member, a first reference axis and a second reference axis that are orthogonal to each other in a plane that is orthogonal to an optical axis of the lens barrel are set in the hand movement correcting mechanism.

The movable member rotates around the first reference axis and the second reference axis. In order to detect the position of the movable member by these rotations, the position detecting means includes a first position sensor for detecting a position of the movable member with respect to the first reference axis and a second position sensor for detecting a position of the movable member with respect to the second reference axis. On the basis of the positions of the movable member detected by the first and second position sensors, a control signal is generated and output to the actuator. This causes the lens barrel held by the movable member to move, so that distortion in an image that is formed on a surface of an image pickup element can be suppressed.

However, since the movable member that is described in Patent Document 1 rotates around the first reference axis and the second reference axis, the first position sensor, which is not intended for detecting the position of the movable member with respect to the second reference axis, may also detect the position of the movable member with respect to the second reference axis, in addition to the position of the movable member with respect to the first reference axis. Therefore, the first position sensor, which is not intended for detecting the position of the movable member with respect to the second reference axis, may output an output signal that includes a signal indicating that the position of the movable member with respect to the second reference axis has been detected. Consequently, the precision with which a distortion of an image caused by, for example, hand movement, is corrected is reduced because the correction is based on such an output signal.

SUMMARY OF THE INVENTION

Accordingly, an aspect of the present invention is to provide a lens driving device that is capable of correcting image shake with good precision.

To this end, according to the aspect of the present invention, there is provided a lens driving device including a base member, a movable member that is disposed at the base member and that moves in a plane that is orthogonal to an optical axis, a first driving portion that moves the movable member in a direction that is orthogonal to the optical axis in accordance with image shake, a lens frame that is mounted to the movable member and that moves in a direction of the optical axis, a second driving portion that moves the lens frame in the direction of the optical axis and that includes a first magnet that is secured to the movable member and a first coil that is secured to the lens frame, and a Hall element that is disposed so as to oppose the first magnet in the direction of the optical axis and that detects a change in a magnetic field of the first magnet.

According to the above-described lens driving device, since the movable member moves in a plane that is orthogonal to the optical axis, the first magnet that is secured to the movable member also moves in the plane that is orthogonal to the optical axis. The Hall element is disposed so as to oppose the first magnet in the direction of the optical axis. By these structures, even if the movable member moves in the plane that is orthogonal to the optical axis, the distance between the Hall element and the first magnet is maintained at a constant distance. Therefore, a change in a magnetic field that is detected by the Hall element is caused by a displacement of the movable member in the plane that is orthogonal to the optical axis, and is not caused by a displacement of the movable member in the direction of the optical axis. Consequently, since the Hall element detects only a change in a magnetic field caused by a displacement of the movable member in the plane that is orthogonal to the optical axis, it is possible to correct image shake with good precision. In addition, since common use of a magnet is possible for driving the lens frame and for detecting a displacement of the movable member, it is possible to reduce the number of parts of the lens driving device and, thus, to reduce the size of the lens driving device.

The first driving portion may include a second magnet that is secured to the movable member and a second coil that is secured to the base member so as to oppose the second magnet in the direction of the optical axis.

In this way, the first magnet and the second magnet are secured to the movable member. Therefore, even if the movable member moves in a plane that is orthogonal to the optical axis, the position of the second magnet relative to the position of the first magnet is maintained. That is, even if the magnetic field of the second magnet interferes with the magnetic field of the first magnet, the overall state of the magnetic field is kept constant at all times. Consequently, since the Hall element detects only a change in a magnetic field that is caused by a displacement of the movable member in the plane that is orthogonal to the optical axis, it is possible to eliminate the influence of the first driving portion when detecting the position of the movable member by the Hall element.

At least two of the Hall elements may be provided, the at least two of the Hall elements being disposed so as to oppose the first magnet in the direction of the optical axis and being disposed with a phase angle of 90 degrees around the optical axis in the plane that is orthogonal to the optical axis. According to such a structure, it is possible to perform image shake correction control on the position of the movable member with good precision on the basis of an orthogonal coordinate system.

According to the aspect of the present invention, it is possible to correct image shake with good precision.

DETAILED DESCRIPTION

A lens driving device according to an example of the present invention will hereunder be described in detail with reference to the drawings.

Figure 1:
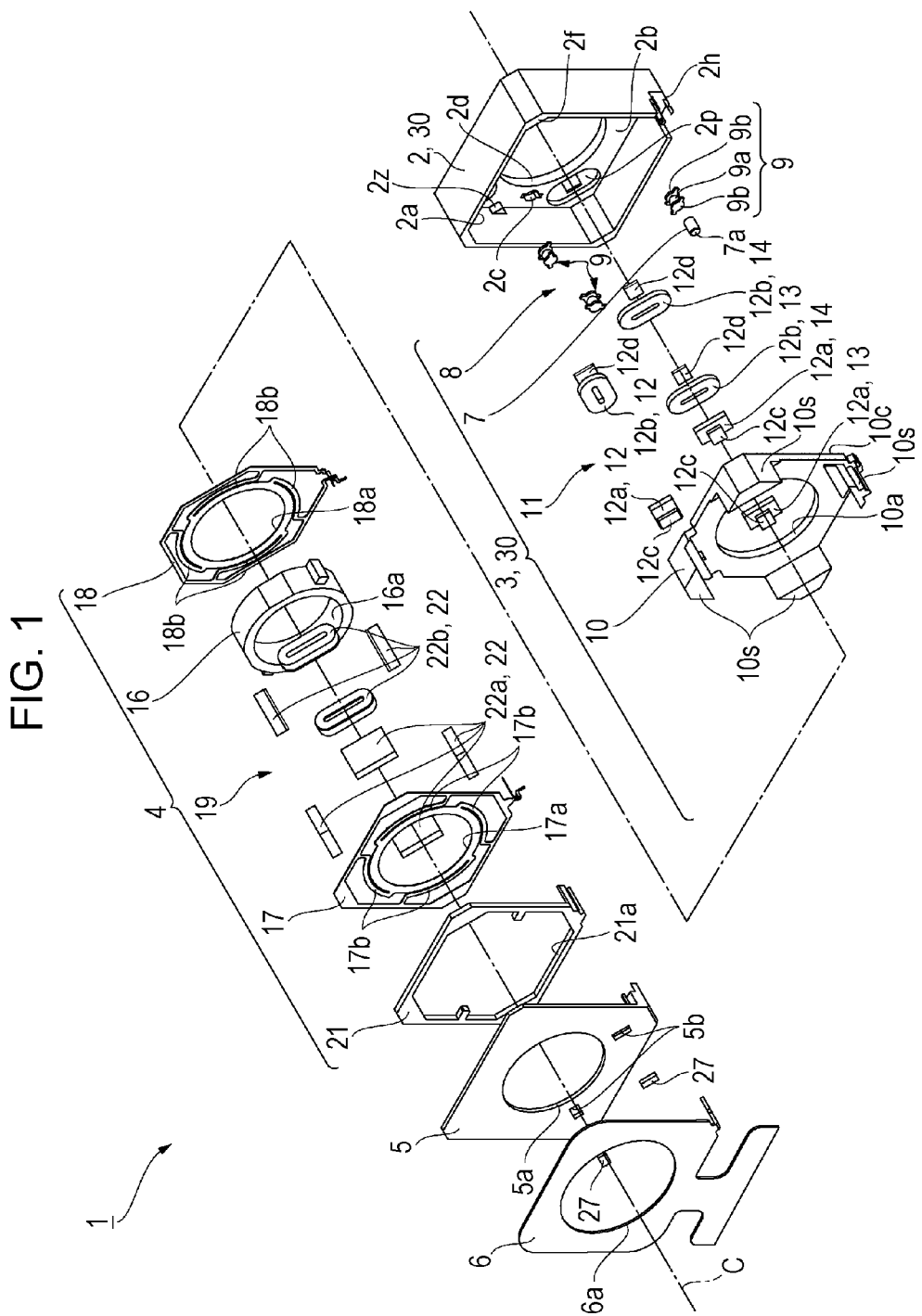
FIG. 1 is an exploded perspective view of a lens driving device according to an example of the present invention.

As shown in FIG. 1, a lens driving device 1 that corrects hand movement and is used in a digital camera includes a box-shaped base member 2, a hand movement correcting mechanism 3, a focus adjusting mechanism 4, a cover 5, and a flexible printed board 6. The base member 2 accommodates the hand movement correcting mechanism 3 and the focus adjusting mechanism 4. The hand movement correcting mechanism 3 corrects hand movement as a result of moving the focus adjusting mechanism 4 in a plane that is orthogonal to an optical axis C. The focus adjusting mechanism 4 includes a lens (not shown), and moves the lens in a direction of the optical axis C. The cover 5 covers the base member 2. The flexible printed board 6 is for providing electrical connection between the lens driving device 1 and an external circuit. The lens driving device 1 is used by being disposed in front of a complementary metal oxide semiconductor (CMOS) image sensor or a charged coupled device (CCD) image sensor (not shown), which is an image pickup element.

A hand movement correcting device 30 includes the base member 2 and the hand movement correcting mechanism 3. Hand movement correction is one form of image shake correction for correcting image shake.

The base member 2 is a rectangular parallelepiped box-like member having a rectangular opening 2a formed around the optical axis C. A supporting surface 2b extending orthogonal to the optical axis C is provided in the base member 2. Recesses 2c and a hole 2g are formed in the supporting surface 2b. The hole 2g is formed between one corner 2h and a circular opening 2d that is formed around the optical axis C (see FIG. 3).

The hand movement correcting mechanism 3 corrects hand movement as a result of moving the focus adjusting mechanism 4, mounted to a movable member 10, in a plane that is orthogonal to the optical axis C. The hand movement correcting mechanism 3 includes a supporting portion 8, the movable member 10, a first driving portion 11, and a regulating portion 15. The supporting portion 8 has the form of a ball for supporting the movable member 10 having the form of a frame. The focus adjusting mechanism 4 is mounted to the movable member 10. The first driving portion drives the movable member 10 in a direction that is orthogonal to the optical axis C. The regulating portion 15 regulates the movement of the movable member 10 in the base member 2.

The supporting portion 8 for movably supporting the movable member 10 in a plane that is orthogonal to the optical axis C includes three supporting portions 9. Each supporting portion 9 includes a metallic spherical body 9a that supports the movable member 10, and a pair of slide plates 9b between which the spherical member 9a is interposed for reducing rolling resistance of the associated spherical member 9a.

The movable member 10 for moving the focus adjusting mechanism 4 in a direction that is orthogonal to the optical axis C is accommodated in the base member 2 while being supported by the supporting portion 8. The movable member 10 is a rectangular parallelepiped member having a circular opening 10a formed around the optical axis C. The movable member 10 includes a bottom surface 10c that opposes the supporting surface 2b of the base member 2.

Figure 4:
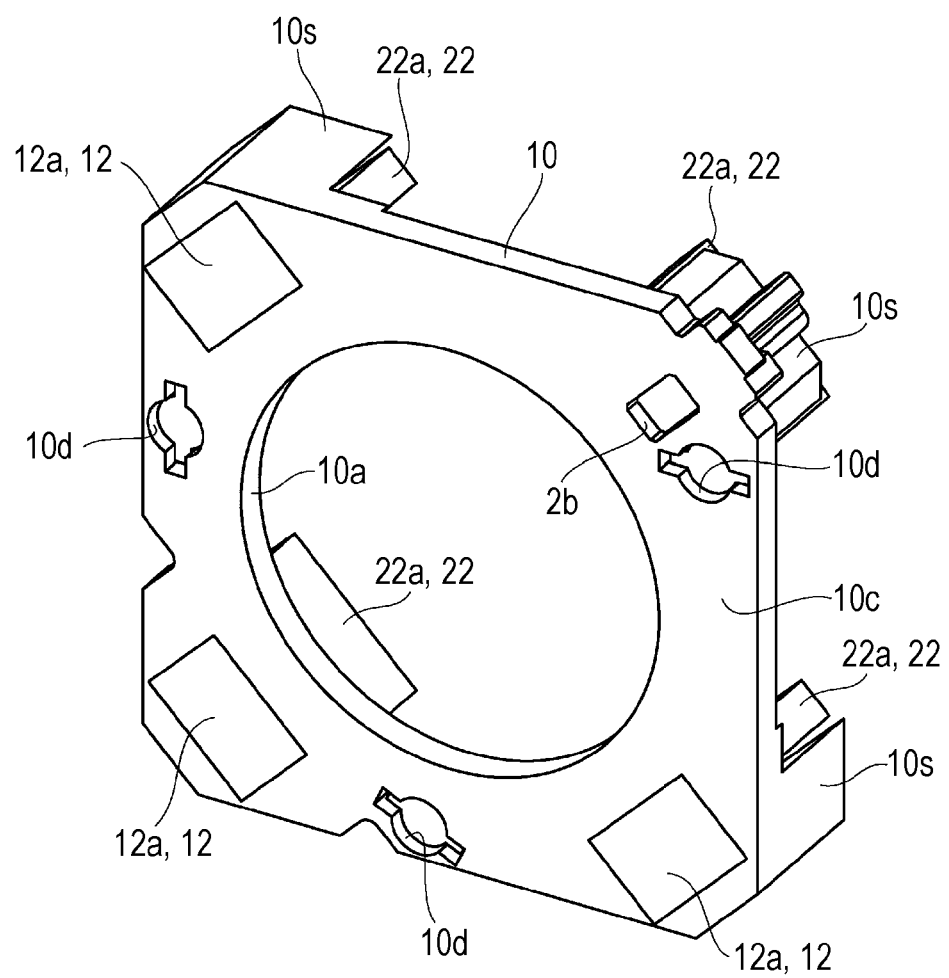
FIG. 4 is a perspective view of a movable member shown in FIG. 1.

As shown in FIG. 4, recesses 10d are formed in the bottom surface 10c of the movable member 10, with one of the slide plates 9b being fixed to its associated recess 10d. For fixing each of the other slide plates 9b, the recesses 2c are formed in positions of the base member 2 corresponding to the positions of the recesses 10d. Each spherical body 9a is disposed between its associated recess 2c and its associated recess 10d. The inside diameter of each recess 2c and the inside diameter of each recess 10d are formed larger than the outside diameter of each spherical body 9a. Therefore, each spherical body 9a can roll within a range of its corresponding recess 2c. It is recommended that the supporting portions 9 support the movable member 10 so as to be movable in a plane.

Figure 6:
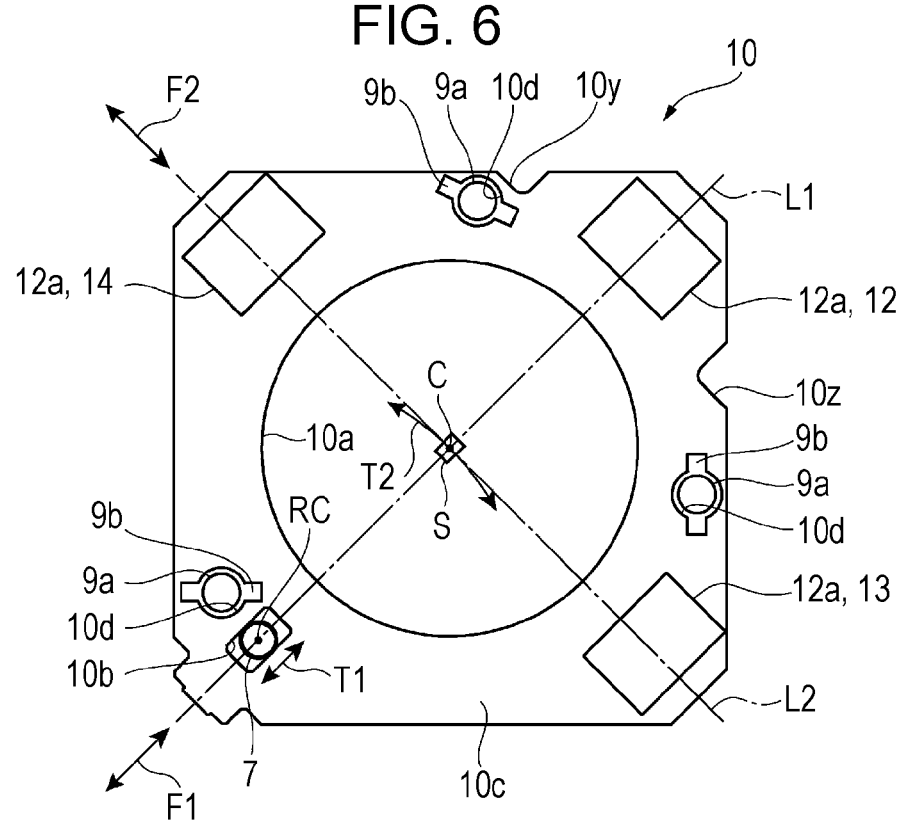
FIG. 6 is a bottom view of the movable member shown in FIG. 1.

The first driving portion 11 for driving the movable member 10 in a direction that is orthogonal to the optical axis C includes three actuators 12, 13, and 14. As shown in FIG. 6, the actuator 12 and a cut portion 10b (described later) are formed on a diagonal L1. The actuator 12 and the cut portion 10b are provided so as to oppose each other with the optical axis C being disposed therebetween. The actuator 12 applies a driving force F1 to the movable member 10. The driving force F1 has a component in a direction along the diagonal L1.

The actuators 13 and 14 are disposed on a different diagonal L2 that is orthogonal to the diagonal L1. The actuators 13 and 14 are provided so as to oppose each other with the optical axis C being disposed therebetween. The actuators 13 and 14 apply a driving force F2 to the movable member 10. The driving force F2 has a component in a direction along the diagonal L2.

Figure 3:
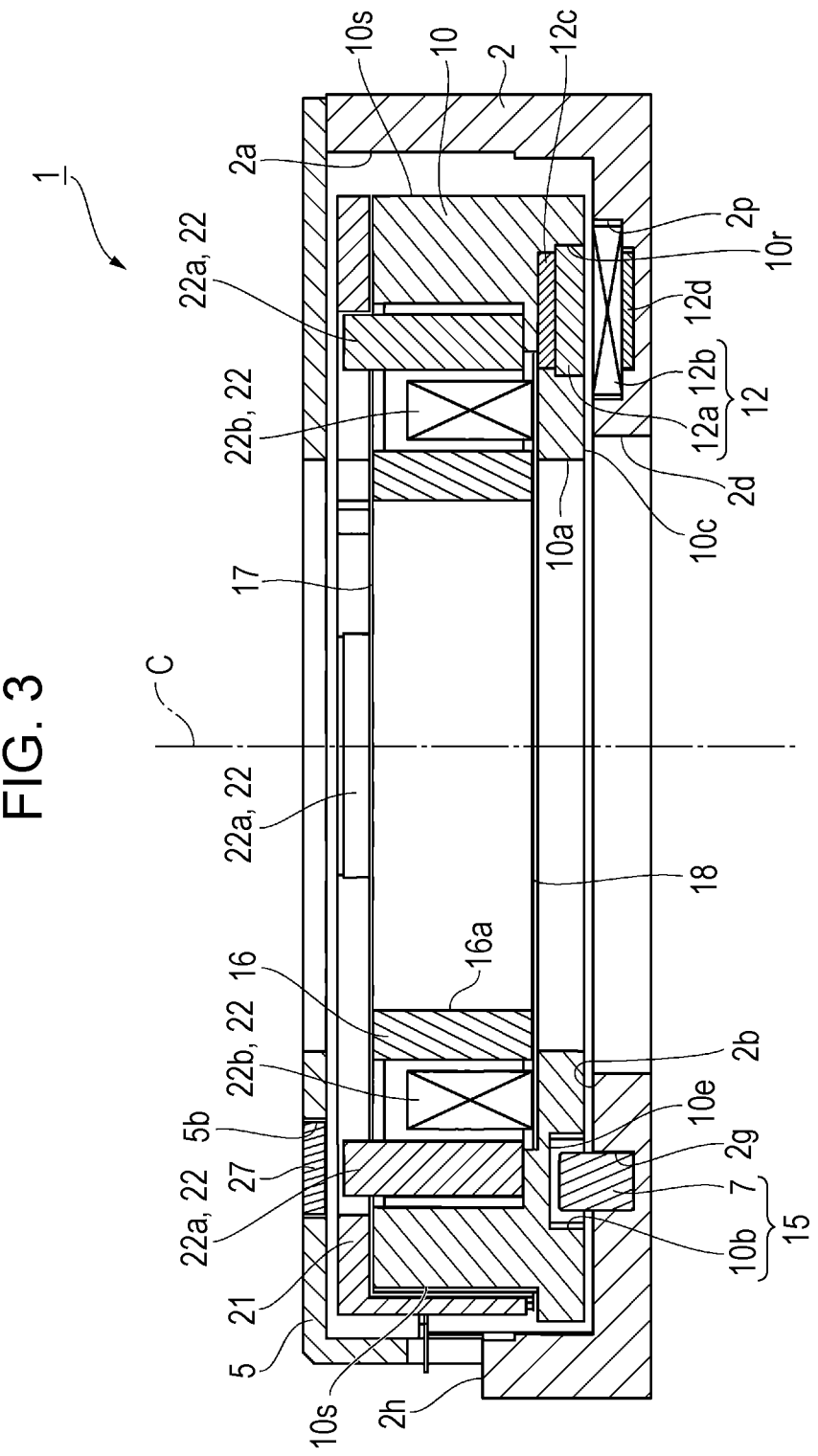
FIG. 3 is a sectional view of the lens driving device taken along line III-III in FIG. 2.

The actuators 12, 13, and 14 have the same structure. Here, the structure of the actuator 12 will be described as an example. As shown in FIGS. 1 and 3, the actuator 12 includes a second magnet 12a and a second coil 12b. The second magnet 12a is a plate-shaped magnet subjected to bipolar magnetization. The second coil 12b moves the movable member 10 in cooperation with the magnet 12a. The magnet 12a is disposed in a recess 10r of the bottom surface 10c of the movable member 10. The coil 12b is disposed in a recess 2p formed in the supporting surface 2b of the base member 2 so that a center axis of a winding is parallel to the optical axis C. The magnet 12a is disposed so as to oppose the coil 12b in a direction of the optical axis C.

The actuator 12 is disposed between a pair of yoke plates 12c and 12d, with the yoke plate 12c being disposed at a side of the magnet 12a and the yoke plate 12d being disposed at a side of the coil 12b. By disposing the actuator 12 in this way, a magnetic path is provided between the magnet 12a and the coil 12b. Even if the coil 12b is in a state in which electricity is not applied thereto, since magnetic attraction acts between the magnet 12a and the yoke plate 12d, the movable member 10 is maintained in position.

As shown in FIG. 3, the regulating portion 15 for regulating the movement of the movable member 10 includes a pin 7 that is secured to the base member 2 and the cut portion 10b that is formed in the movable member 10.

The pin 7 is a circular cylindrical member extending in the direction of the optical axis C. A base end of the pin 7 is inserted into and secured to the hole 2g formed in the base member 2.

As shown in FIG. 6, the cut portion 10b formed in the movable member 10 is a long cut portion extending along the diagonal L1 in the movable member 10. The cut portion 10b is formed at a position in the bottom surface 10c that corresponds to the position of the hole 2g in which the pin 7 is inserted. By forming the cut portion 10b in such a position, the pin 7 is inserted into the cut portion 10b. The width of the cut portion 10b in a direction that is orthogonal to a longitudinal direction of the cut portion 10b is set so as to allow sliding of the pin 7 with respect to a side surface that defines the cut portion 10b. The cut portion 10b that is rectangular in cross section is defined by a pair of side walls that oppose each other.

The pin 7 is inserted into the cut portion 10b of the movable member 10, and the cut portion 10b extends along the diagonal L1. Therefore, the movable member 10 is capable of moving linearly by being guided in a direction of a linear movement path T1 that is provided in the direction of extension of the cut portion 10b, and is capable of rotating along a rotation path T2, with the pin 7 that is disposed on the linear movement path T1 being a rotational center RC of the rotation path T2. That is, the position of the movable member 10 can be represented by circular polar coordinates that are based on one radius vector and one angle of deviation. Combining the linear movement and the rotation allows a position of the optical axis C to move to a desired position with good precision.

A movable range S of the optical axis C is based on a linearly movable distance and a rotatable angle. The distance that the movable member 10 is capable of moving linearly is determined by the length of the cut portion 10b in the longitudinal direction of the cut portion 10b. The angle by which the movable member 10 is rotatable is determined by the distances between cutaway portions 10y and 10z and contact portions 2y and 2z. The cutaway portions 10y and 10z are formed by cutting outer edges of the movable member 10. The contact portions 2y and 2z are surfaces on the base member 2 that extend along a longitudinal direction of the cut portion 10b. The angle by which the movable member 10 is rotatable may be determined by the distances of the spherical bodies 9a in the recesses 2c or the recesses 10d.

As shown in FIG. 1, the focus adjusting mechanism 4 that is mounted to the movable member 10 includes a lens frame 16 that holds a lens (not shown), plate springs 17 and that urge the lens frame 16 in the direction of the optical axis C, a second driving portion 19 that drives the lens frame 16 in the direction of the optical axis C, and a fixing frame 21 that reinforces a fixed state of the plate spring 17 to the movable member 10.

The lens frame 16 for holding a lens group including a single lens or a plurality of lenses (not shown) is a circular cylindrical member having a hole 16a to which the lens or lenses are fitted. The optical axis C is an optical axis of the lens or lenses disposed in the lens frame 16. The lens frame 16 is interposed between the plate springs 17 and 18 in the direction of the optical axis C.

The plate spring 17 is a thin rectangular member having a circular opening 17a formed around the optical axis C. The plate spring 17 is disposed between the fixing frame 21 and the lens frame 16. The outer periphery of the plate spring 17 is secured to the movable member 10, and the inner periphery of the plate spring 17 is secured to the lens frame 16. The outer periphery and the inner periphery of the plate spring 17 are connected by a resilient arm 17b. The plate spring 17 is resilient in the direction of the optical axis C by the arm 17b.

The plate spring 18 is a thin rectangular member having a circular opening 18a formed around the optical axis C. The plate spring 18 is disposed between the lens frame 16 and the movable member 10. The outer periphery of the plate spring 18 is secured to the movable member 10, and the inner periphery of the plate spring 18 is secured to the lens frame 16. The outer periphery and the inner periphery of the plate spring 18 are connected by a resilient arm 18b. The plate spring 18 is resilient in the direction of the optical axis C by the arm 18b.

The second driving portion 19 for driving the lens frame 16 in the direction of the optical axis C includes four actuators 22. The actuators 22 are disposed with a phase difference of 90 degrees in a plane that is orthogonal to the optical axis C.

Each actuator 22 having the same structure includes a first magnet 22a that is a plate-shaped magnet subjected to bipolar magnetization and a first coil 22b that, in cooperation with the associated magnet 22a, moves the lens frame 16. Each magnet 22a may be a magnet that is subjected to magnetization for two or more poles.

Figure 5:
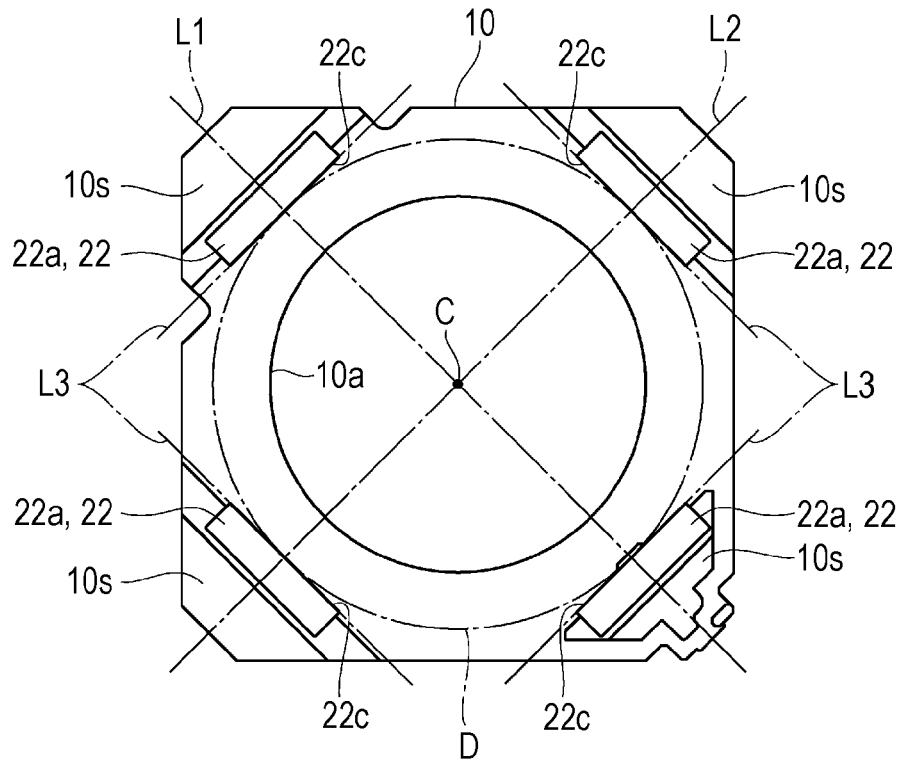
FIG. 5 is a plan view of the movable member shown in FIG. 1.

The four magnets 22a are secured to standing portions 10s of the movable member 10 so that surfaces 22c of the magnets 22a facing the lens frame 16 extend along tangential lines L3 to a virtual circle D formed around the optical axis C (see FIG. 5). Each coil 22b is disposed at the lens frame 16 so that a center axis of a winding is orthogonal to the optical axis C. The coils 22b are bonded and secured to positions at an outer peripheral surface of the lens frame 16 that oppose the magnets 22a in a direction that is orthogonal to the optical axis C. Such an arrangement of the magnets 22a and the coils 22b is called a moving coil arrangement.

At the actuators 22, the lens frame 16 to which the coils 22b are secured moves in the direction of the optical axis C with respect to the magnets 22a, but does not move in a direction that is orthogonal to the optical axis C with respect to the magnets 22a. Therefore, since the distances between the magnets 22a and the coils 22b in a direction that is orthogonal to the optical axis C are maintained, it is possible to easily control the position of the lens frame 16 in the direction of the optical axis C.

The fixing frame 21 for reinforcing the fixed state of the plate spring 17 to the movable member 10 is a plate-shaped member having an opening 21a. The fixing frame 21 is secured to top surfaces of the standing portions 10s of the movable member 10.

The cover 5 is a plate-shaped member that is secured to an open-side edge portion 2f of the base member 2, and has a circular opening 5a formed around the optical axis C. Two Hall elements 27, serving as magnetic field detecting elements, are disposed at the cover 5.

The Hall elements 27 detect the intensities of the magnetic fields of the magnets 22a disposed at the movable member 10, and output voltages corresponding to the intensities of the magnetic fields. When the movable member 10 moves in a plane that is orthogonal to the optical axis C, the intensities of the magnetic fields that pass the Hall elements 27 change, so that the output voltages change. The position of the movable member 10 in the plane is determined on the basis of the changes in the voltages.

Since the Hall elements 27 serve as references for detecting the movement of the movable member 10, it is necessary to dispose the Hall elements 27 in position with respect to an image pickup element (not shown). As shown in FIG. 3, the Hall elements 27 are secured to associated holes 5b of the cover 5, secured to the base member 2, so as to oppose the magnets 22a in the direction of the optical axis C. By such a structure, since the positions of the Hall elements 27 do not vary as the movable member 10 moves, it is possible to dispose the Hall elements 27 in position with respect to the image pickup element (not shown). Since the Hall elements 27 are disposed near the magnets 22a, it is possible to detect changes in the magnetic fields of the magnets 22a with good precision.

Figure 2:
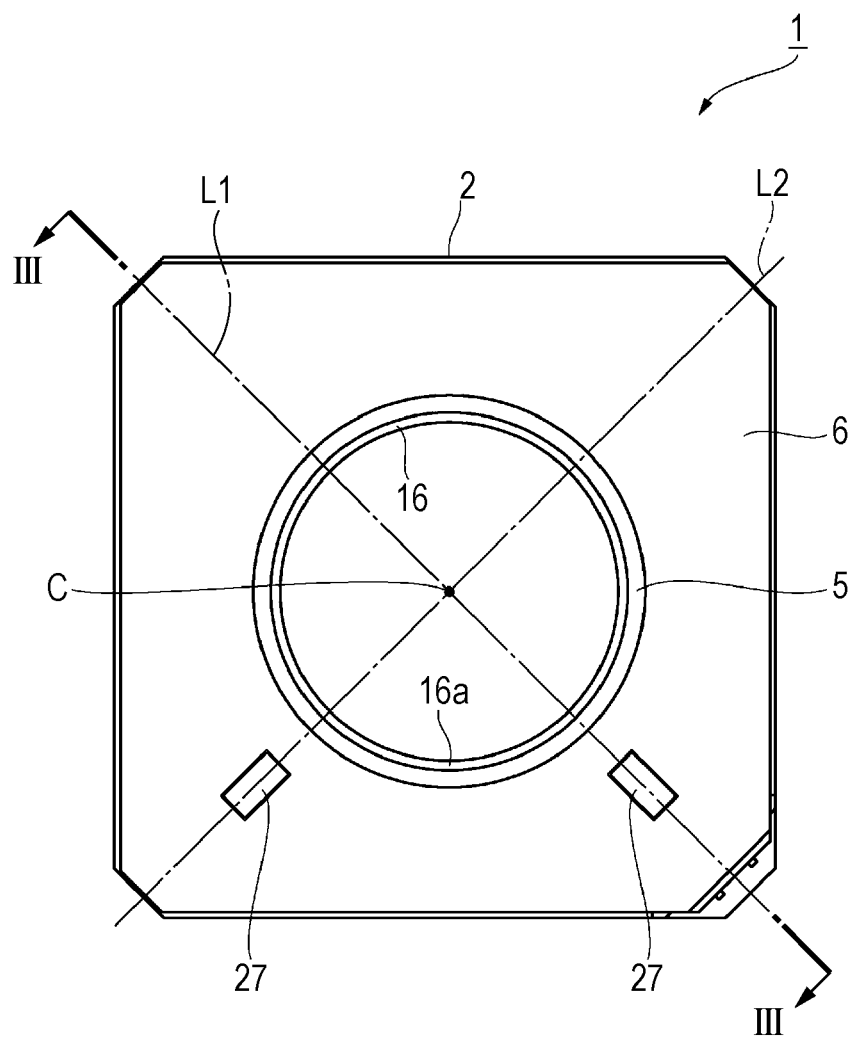
FIG. 2 is a plan view of the lens driving device shown in FIG. 1.

The Hall elements 27 are disposed in a plane that is orthogonal to the optical axis C with a phase difference of 90 degrees around the optical axis C (see FIG. 2). Therefore, it is possible to detect the position of the movable member 10 in the plane that is orthogonal to the optical axis, and to control the position of the movable member 10 on the basis of an orthogonal coordinate system.

The flexible printed board 6, which is a circuit board for providing electrical connection between the lens driving device 1 and an external circuit, is connected to the Hall elements 27. Voltage signals output from the Hall elements 27 are output to the external circuit through the flexible printed board 6.

Next, the operation of the hand movement correcting mechanism 3 is described. If hand movement occurs when taking photographs with an apparatus (such as a camera) in which the lens driving device 1 is installed, the position of the optical axis C may change. In this case, a sensor that detects hand movement (such as a gyro sensor) detects the hand movement, and a controlling portion outputs a control signal to the coil 12b of the actuator 12, a coil 12b of the actuator 13, and a coil 12b of the actuator 14. The control signal is for driving the hand movement correcting mechanism 3 so as to maintain the position of the optical axis C at a predetermined position on the image pickup element.

In this case, as shown in FIG. 6, the actuator 12 generates a driving force F1 when it receives the control signal, and linearly moves the movable member 10 in the direction of the linear movement path T1. The actuators 13 and 14 generate a driving force F2 when they receive the control signal, and rotate the movable member 10 in the direction of the rotation path T2. By the linear movement and the rotation of the movable member 10, the position of the optical axis C is moved to its predetermined position. At this time, the movement of the movable member 10 is regulated by the regulating portion 15, and the movable member 10 includes a total of two degrees of freedom, that is, one degree of freedom for the linear movement and one degree of freedom for the rotation. Therefore, the movable member 10 can move the position of the optical axis C to its desired position within the range S. By this movement, the position of the optical axis C on the image pickup element (such as CMOS) is maintained at its predetermined position, so that hand movement is corrected.

In the lens driving device 1 having such a structure, the magnets 22a do not move in the direction of the optical axis C, so that, even if the movable member 10 moves in a plane that is orthogonal to the optical axis C, the distances between the Hall elements 27 and the magnets 22a are maintained at constant distances. Therefore, the Hall elements 27 detect only changes in the intensities of magnetic fields resulting from the position of the movable member 10 in the plane that is orthogonal to the optical axis C, so that it is possible to correct hand movement with good precision.

According to the lens driving device 1, common use of magnets is possible for driving the lens frame 16 and for detecting the position of the movable member 10. Therefore, it is possible to reduce the number of parts of the lens driving device and, thus, to reduce the size of the lens driving device.

According to the lens driving device 1, even if the movable member 10 moves in a plane that is orthogonal to the optical axis C, the position of each first magnet 22a of the second driving portion 19 relative to each second magnet 12a of the first driving portion 11 is maintained. Therefore, the state of the magnetic field at each first magnet 22a with which the magnetic field of each second magnet 12a interferes is maintained. Consequently, since the Hall elements 27 detect only changes in a magnetic field resulting from the position of the movable member 10 in the plane that is orthogonal to the optical axis C, it is possible to correct hand movement with good precision.

According to the lens driving device 1, the coils 22b are disposed so as to oppose the associated magnets 22a. Therefore, even if the movable member 10 moves in a direction that is orthogonal to the optical axis C, the distances between the magnets 22a and the coils 22b are maintained at constant distances. Therefore, it is possible to easily control the position of the movable member 10 in a the plane that is orthogonal to the optical axis C.

The present invention is not limited to the above-described example.

Although the second driving portion 19 is provided at the lens frame 16 so that the center axes of the windings of the first coils 22b are orthogonal to the optical axis C, the second driving portion 19 may be wound around the outer periphery of the lens frame 16 so that the center axis of the winding of one first coil 22b is disposed along the optical axis C or so that the center axes of the windings of a plurality of first coils 22b are disposed along the optical axis C.

Although the lens frame 16 of the focus adjusting mechanism 4 includes a focus adjustment lens, the lens frame of the focus adjusting mechanism 4 may include a zoom lens for angle-of-view adjustments.

Obviously, numerous modifications and variations of the present invention are possible in light of the above teachings. It is therefore to be understood that within the scope of the appended claims, the invention may be practiced otherwise than as specifically described herein.

What is claimed is:

1. A lens driving device comprising:
a base member;
a movable member that is disposed at the base member and moves in a plane that is orthogonal to an optical axis;
a first driving portion that moves the movable member in a direction that is orthogonal to the optical axis in accordance with image shake;
a lens frame that is mounted to the movable member and moves in a direction of the optical axis;
a second driving portion that moves the lens frame in the direction of the optical axis, the second driving portion including a first magnet that is secured to the movable member and a first coil that is secured to the lens frame; and
a Hall element that is disposed so as to oppose the first magnet in the direction of the optical axis, the Hall element detecting a change in a magnetic field of the first magnet.

2. The lens driving device according to claim 1, wherein the first driving portion includes a second magnet that is secured to the movable member and a second coil that is secured to the base member so as to oppose the second magnet in the direction of the optical axis.

3. The lens driving device according to either claim 1 or claim 2, wherein at least two of the Hall elements are provided, the at least two of the Hall elements being disposed so as to oppose the first magnet in the direction of the optical axis and being disposed with a phase angle of 90 degrees around the optical axis in the plane that is orthogonal to the optical axis.

* * * * *